April 13, 1937.  B. F. CONNER  2,076,551

JAR

Filed April 16, 1935

Inventor
Benjamin F. Conner
By S. Jay Tiller
Attorney

Patented Apr. 13, 1937

2,076,551

UNITED STATES PATENT OFFICE 2,076,551

JAR

Benjamin F. Conner, West Hartford, Conn., assignor to Colt's Patent Fire Arms Manufacturing Co., Hartford, Conn., a corporation of Connecticut Application April 16, 1935, Serial No. 16,721

1 Claim. (Cl. 215—1)

The invention relates particularly to jars adapted or intended primarily for containing cosmetic preparations including salves, cold creams, and other preparations of a pastelike consistency and also including powders. Jars for preparations of the general character referred to have heretofore been ordinarily made of glass, but it has been proposed, and to some extent practiced, to make such jars of synthetic resin materials or other moldable materials. In my copending application for Jars, Serial No. 18,031 filed April 24, 1935, I have disclosed a jar of this general class made from synthetic resin materials and comprising two thin-walled separately molded concentric members. The general object of the present invention is to provide a jar of the general class referred to which avoids the use of glass and attains some of the advantages incident to synthetic resin materials, but which can be manufactured at less cost than the composite jar shown and described in the application referred to.

In the accompanying drawing I have illustrated the form of jar embodying the invention which I now deem preferable, but it will be understood that the drawing is intended for illustrative purposes only and is not to be relied upon as defining or limiting the scope of the invention, the claim forming a part of this specification being relied upon for that purpose.

Figure 1:
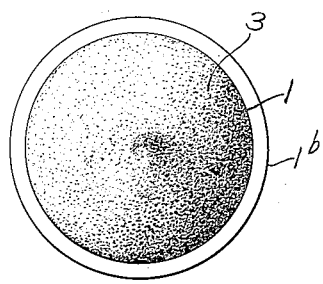
Fig. 1 is a plan view of a jar embodying the invention.
Figure 2:
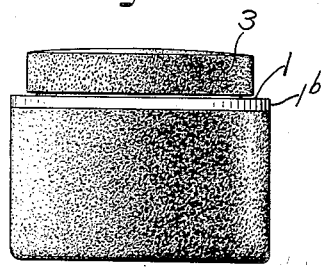
Fig. 2 is a side view.
Figure 3:
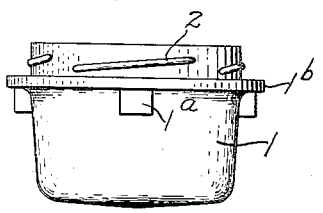
Fig. 3 is a side view of the inner member of the jar.
Figure 4:
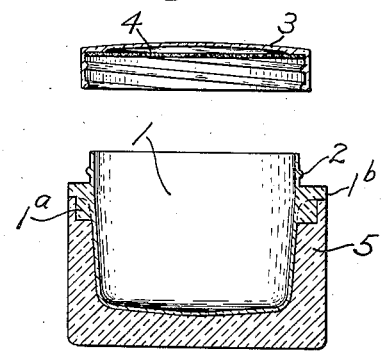
Fig. 4 is a central vertical section view, the closure being separated from the jar proper.

Referring to the drawing, I represents the inner member of the jar, this inner member being cup-shaped and having relatively thin walls. It is molded in any usual or preferred way from a suitable material of the synthetic resin class, the material being selected so as to be highly resistant to the deteriorative action of cosmetic and other products. The exact character of the material of the member 1 may be varied according to the cream or other preparation that is to be contained in the jar. The inner member 1 is externally threaded adjacent its upper periphery, as shown at 2, and a closure 3 of the cap type is provided which is interiorly threaded to engage the thread 2 on the inner member. The closure or cap 3 may be provided with a gasket or liner at 4.

In lieu of an independently molded outer member of synthetic resin material, as disclosed in my aforesaid pending application, I provide an outer body 5 which is molded around the inner member so that the exterior of the said inner member and the interior of the outer member are in intimate contact throughout. The inner member 1 is preferably provided with projections or lugs such as 1ª which are surrounded by the material of the body 5 so as to prevent any relative rotation between the said inner member and the said outer body.

While I do not necessarily so limit myself, I prefer to provide the inner member 1 with a peripheral annular rib 1ᵇ which has a diameter greater than the diameter of the cap 3 and which preferably has the same diameter of the outer body 5. This annular rib 1ᵇ is exteriorly exposed and may provide a pleasing color contrast with the color of the closure or with the color of the body 5 or with both.

In accordance with the present invention, the material of the outer body 5 may be considerably less expensive than the synthetic resin material of the inner body and it may be less resistant to the deteriorative action of the products to be contained in the jar. The said material of the outer body is preferably a thermo-plastic material which becomes soft and plastic at a relatively low temperature. Shellac may be taken as an example of such a material.

The inner member 1 is molded in accordance with known practice at a high temperature and under high pressure from a suitable material of the synthetic resin class. Thereafter the completely molded and cured inner member 1 is placed in a suitably shaped mold and the outer body 5 is molded around and in contact with the exterior of the inner member 1. The material of the outer body is such that it is plastic and moldable at a temperature so low that there is no impairment of the synthetic resin material of the inner member. It will be observed that inasmuch as the outer body is molded in direct contact with the inner member no complicated or expensive mold is required, it being necessary to provide only a simple mold which will determine the exterior contour of the outer body.

A jar constructed in accordance with the present invention does not have all of the advantages that are incident to a jar embodying the invention set forth in my aforesaid copending application Serial No. 18,031; but it does have certain advantages over the conventional glass jar, and it is particularly suited for use when a low cost is a determining factor. The thermo-plastic material of the outer body 5 is less expensive than the synthetic resin material which would be required for a separately molded outer member, and the cost of molding is somewhat less.

What I claim is:

The combination in a jar of the class described, of an inner thin-walled cup-shaped member externally threaded adjacent its upper periphery, the said inner member having an annular rib immediately below the threaded portion, an outer body molded around the inner member below the annular rib thereon so that the exterior of the inner member and the interior of the outer member are in intimate contact throughout, the said outer body having an external contour substantially different from that of the inner body and having a diameter such that the periphery of the rib on the inner member is exposed, and a closure of the cap type interiorly threaded to engage the thread on the inner member.

BENJAMIN F. CONNER.